(12) United States Patent
Hubert et al.

(10) Patent No.: US 7,798,840 B2
(45) Date of Patent: Sep. 21, 2010

(54) EXPANDABLE AND COLLAPSIBLE PERIPHERAL DEVICE

(75) Inventors: Jonathan Hubert, Los Gatos, CA (US); Jason P. Hanlon, Scotts Valley, CA (US); Kevin M. Conley, San Jose, CA (US)

(73) Assignee: SanDisk Corporation, Milpitas, CA (US)

( * ) Notice: Subject to any disclaimer, the term of this patent is extended or adjusted under 35 U.S.C. 154(b) by 0 days.

(21) Appl. No.: 11/620,519

(22) Filed: Jan. 5, 2007

(65) Prior Publication Data
US 2008/0166897 A1 Jul. 10, 2008

(51) Int. Cl.
*H01R 13/64* (2006.01)
(52) U.S. Cl. ...................................... 439/377
(58) Field of Classification Search ................. 439/377, 439/630, 159, 633, 946
See application file for complete search history.

(56) References Cited

U.S. PATENT DOCUMENTS

| | | | |
|---|---|---|---|
| 5,514,862 A * | 5/1996 | Salzano | 235/487 |
| 5,581,127 A * | 12/1996 | Shinohara | 257/679 |
| 5,905,253 A | 5/1999 | Ito et al. | |
| 6,101,372 A | 8/2000 | Kubo | |
| 6,179,665 B1 | 1/2001 | Rossman et al. | |
| 6,234,844 B1 * | 5/2001 | Somerville et al. | 439/630 |
| 6,264,506 B1 | 7/2001 | Yasufuku et al. | |
| 6,402,558 B1 | 6/2002 | Hung-Ju et al. | |
| 6,438,638 B1 | 8/2002 | Jones et al. | |
| 6,567,273 B1 | 5/2003 | Liu et al. | |
| 6,574,112 B2 | 6/2003 | Washino et al. | |
| 6,692,268 B2 | 2/2004 | Kung et al. | |
| 6,725,286 B2 | 4/2004 | Takahashi | |
| 6,736,678 B2 | 5/2004 | Yao | |
| 6,751,694 B2 | 6/2004 | Liu et al. | |
| 6,768,644 B2 | 7/2004 | Kakinoki et al. | |
| 6,808,424 B2 | 10/2004 | Kaneshiro et al. | |
| 6,859,369 B2 | 2/2005 | Mambakkam et al. | |
| 6,908,038 B1 * | 6/2005 | Le | 235/492 |
| 6,976,624 B2 | 12/2005 | Hsiao | |
| 6,993,618 B2 | 1/2006 | Chen et al. | |
| 7,044,767 B2 | 5/2006 | Wong et al. | |
| 7,059,913 B1 | 6/2006 | Chen | |

(Continued)

FOREIGN PATENT DOCUMENTS

EP 1587020 A 10/2005

(Continued)

OTHER PUBLICATIONS

U.S. Appl. No. 11/771,763, filed Jun. 29, 2007.

(Continued)

*Primary Examiner*—Jean F Duverne
(74) *Attorney, Agent, or Firm*—Vierra Magen Marcus & DeNiro LLP

(57) ABSTRACT

An expandable and collapsible peripheral device is disclosed, along with methods of manufacturing same. When in an expanded state, the peripheral device may have a length which conforms to the ExpressCard standard, and when in a collapsed state, the peripheral device may have a form factor approximating that of a CompactFlash card. Peripheral devices of the present invention may operate according to standards other than the ExpressCard standard, and may have sizes in the expanded and collapsed positions unrelated to ExpressCards and/or CompactFlash cards.

20 Claims, 4 Drawing Sheets

U.S. PATENT DOCUMENTS

| | | | |
|---|---|---|---|
| 7,075,793 B2 * | 7/2006 | Le et al. ................... 361/737 | |
| 7,092,256 B1 | 8/2006 | Salazar et al. | |
| 7,108,530 B2 | 9/2006 | Kimura et al. | |
| 7,108,557 B2 * | 9/2006 | Kikuchi et al. ............. 439/630 | |
| 7,112,075 B1 | 9/2006 | Su | |
| 7,125,258 B2 | 10/2006 | Nakakubo et al. | |
| 7,172,430 B2 | 2/2007 | Kojima | |
| 7,182,645 B2 * | 2/2007 | Shimizu et al. ............ 439/630 | |
| 7,217,150 B2 | 5/2007 | Lekic et al. | |
| 7,265,989 B2 | 9/2007 | Son et al. | |
| 7,281,953 B1 | 10/2007 | Jochym et al. | |
| 7,300,314 B2 | 11/2007 | Kim | |
| 7,306,467 B2 | 12/2007 | Morino et al. | |
| 7,326,086 B1 | 2/2008 | Lee | |
| 7,341,461 B1 | 3/2008 | Yen et al. | |
| 7,354,312 B2 | 4/2008 | Chuang | |
| 7,367,511 B2 | 5/2008 | Thornton et al. | |
| 7,382,625 B2 | 6/2008 | Thornton et al. | |
| 7,385,827 B2 | 6/2008 | Klatt | |
| 7,416,451 B2 | 8/2008 | Tanaka et al. | |
| 7,460,076 B2 | 12/2008 | Hayes et al. | |
| 7,475,816 B1 * | 1/2009 | Rochelo .................... 235/386 | |
| 7,534,116 B2 | 5/2009 | Ho | |
| 2002/0002061 A1 | 1/2002 | Miyasaka et al. | |
| 2002/0076954 A1 | 6/2002 | Chen et al. | |
| 2003/0201322 A1 | 10/2003 | Wu | |
| 2004/0087213 A1 | 5/2004 | Kao | |
| 2005/0048833 A1 | 3/2005 | Kimura et al. | |
| 2005/0066102 A1 | 3/2005 | Yamamoto et al. | |
| 2005/0114587 A1 | 5/2005 | Chou et al. | |
| 2005/0251609 A1 | 11/2005 | Chou et al. | |
| 2005/0258243 A1 * | 11/2005 | Hsieh ........................ 235/441 | |
| 2008/0123274 A1 * | 5/2008 | Desrosiers et al. ......... 361/683 | |
| 2008/0168204 A1 | 7/2008 | Sultenfuss et al. | |
| 2008/0228986 A1 | 9/2008 | Lodolo | |
| 2008/0270663 A1 | 10/2008 | Fry et al. | |

FOREIGN PATENT DOCUMENTS

| | | | |
|---|---|---|---|
| WO | 9744867 A | 11/1997 | |
| WO | 2005106781 A | 11/2005 | |

OTHER PUBLICATIONS

U.S. Appl. No. 11/771,767, filed Jun. 29, 2007.
U.S. Appl. No. 11/771,756, filed Jun. 29, 2007.
U.S. Appl. No. 11/771,717, filed Jun. 29, 2007.
U.S. Appl. No. 11/771,730, filed Jun. 29, 2007.
U.S. Appl. No. 11/771,744, filed Jun. 29, 2007.
U.S. Appl. No. 11/771,752, filed Jun. 29, 2007.
Office Action mailed Dec. 28, 2007 in U.S. Appl. No. 11/620,530, filed Jan. 5, 2007.
Response to Office Action dated Apr. 25, 2008, U.S. Appl. No. 11/620,530, filed Jan. 5, 2007.
Office Action dated May 13, 2008, U.S. Appl. No. 11/771,717, filed Jun. 29, 2007.
Final Office Action dated Aug. 7, 2008 in U.S. Appl. No. 11/620,530.
Response to Office Action dated Aug. 13, 2008 in U.S. Appl. No. 11/771,717.
International Search Report and Written Opinion dated Jul. 3, 2008 in PCT Application No. PCT/US2007/089069.
Notice of Allowance dated Nov. 14, 2008 in U.S. Appl. No. 11/771,730.
Final Office Action dated Nov. 21, 2008 in U.S. Appl. No. 11/771,717.
Office Action dated Dec. 11, 2008 in U.S. Appl. No. 11/771,756.
Office Action dated Dec. 29, 2008 in U.S. Appl. No. 12/103,533.
International Search Report and Written Opinion dated Dec. 16, 2008 in PCT Application No. PCT/US2008/068531.
Amendment filed Feb. 17, 2009 in U.S. Appl. No. 11/771,730.
Response to Office Action filed Mar. 30, 2009 in U.S. Appl. No. 12/103,533.
Office Action dated Apr. 1, 2009 in U.S. Appl. No. 11/771,744.
Office Action dated May 27, 2009 in U.S. Appl. No. 11/771,756.
Notice of Allowance and Fee(s) Due dated Jun. 17, 2009 in U.S. Appl. No. 11/771,730.
Response to Office Action filed Jun. 25, 2009 in U.S. Appl. No. 11/771,744.
Response to Office Action filed Jun. 30, 2009 in U.S. Appl. No. 11/771,756.
Office Action dated Jul. 7, 2009 in U.S. Appl. No. 11/771,767.
Office Action dated Jul. 10, 2009 in U.S. Appl. No. 12/103,533.
Notice of Allowance and Fee(s) Due dated Feb. 1, 2010 in U.S. Appl. No. 12/103,533.
Notice of Allowance and Fee(s) Due dated Dec. 3, 2009 in U.S. Appl. No. 11/771,767.
Response to Office Action filed Dec. 2, 2009 in U.S. Appl. No. 11/771,744.
Office Action dated Apr. 21, 2010, U.S. Appl. NO. 11/771,752.
Notice of Allowance and Fee(s) Due dated Apr. 23, 2010, U.S. Appl. No. 11/771,744.
Response to Office Action filed Aug. 3, 2009 in U.S. Appl. No. 11/771,767.
Office Action dated Sep. 2, 2009 in U.S. Appl. No. 11/771,744.
Notice of Allowance and Fee(s) Due dated Sep. 14, 2009 in U.S. Appl. No. 11/771,730.
Notice of Allowance and Fee(s) Due dated Oct. 1, 2009 in U.S. Appl. No. 11/771,756.
U.S. Appl. No. 11/620,530, filed Jan. 5, 2007.
Response to Office Action filed Oct. 13, 2009 in U.S. Appl. No. 12/103,533.
Notice of Allowance and Fee(s) Due dated Oct. 19, 2009 in U.S. Appl. No. 11/771,767.
Office Action dated Oct. 22, 2009 in U.S. Appl. No. 11/771,752.
Notice of Allowance and Fee(s) Due dated Oct. 26, 2009 in U.S. Appl. No. 11/771,756.

* cited by examiner

EXPANDABLE AND COLLAPSIBLE PERIPHERAL DEVICE

CROSS-REFERENCE TO RELATED APPLICATIONS

The following application is related to U.S. patent application Ser. No. 11/620,530, entitled "Method of Making an Expandable and Collapsible Peripheral Device," by Jonathan Hubert et al., filed the same day as the present application, which application is incorporated herein by reference in its entirety.

BACKGROUND OF THE INVENTION

1. Field of the Invention

Embodiments of the present invention relate to an expandable and collapsible peripheral device, and method of manufacturing the same.

2. Description of the Related Art

The strong growth in demand for portable consumer electronics is driving the need for high-capacity storage devices. Non-volatile semiconductor memory devices, such as flash memory storage cards, are becoming widely used to meet the ever-growing demands on digital information storage and exchange. Their portability, versatility and rugged design, along with their high reliability and large storage capacity, have made such memory devices ideal for use in a wide variety of electronic devices, including for example digital cameras, digital music players, video game consoles, PDAs and cellular telephones.

One popular type of flash memory device is the CompactFlash® memory card manufactured by SanDisk Corporation, Milpitas, Calif. While used in a variety of different applications, the CompactFlash memory card has been adopted as the de facto standard in the professional and consumer imaging markets. While there are several reasons why this is so, including the large storage capacity and low cost per Megabyte, the form factor of the CompactFlash memory card has proven to be a significant contributing factor. At 43 mm by 36 mm, the card is large enough for easy manipulation, yet small enough for convenient transport and use in current high resolution digital cameras. Professionals and consumers are comfortable with and have grown accustomed to this size memory card.

A few years ago, a coalition of member companies of the Personal Computer Memory Card International Association (PCMCIA) developed the ExpressCard® peripheral as a new standard for PC card technology. Compared to older PC cards, ExpressCard technology uses a simple connector and eliminates the older PC card controller by using direct connections to PCI-Express and USB ports in the host device. The result is faster transfer rates, better performance and lower cost for the card slot implementations in host systems as compared to older generation PC cards.

Given these advantages, there are compelling technology and business reasons why the popularity of the ExpressCard standard will continue to grow. However, standard ExpressCards come in two sizes: the ExpressCard/34 is 75 mm by 34 mm, and the ExpressCard/54 has sides of 75 mm and 54 mm. Both of these are significantly larger than the CompactFlash card. As such, consumers and professionals who have grown accustomed to the CompactFlash form factor may be slow to adopt the ExpressCard standard. It would therefore be advantageous to provide a peripheral device capable of being used in accordance with the ExpressCard standard, yet also having the size, look and feel of the CompactFlash card.

SUMMARY OF THE INVENTION

The present invention, roughly described, relates to an expandable and collapsible peripheral device, and methods of manufacturing same. In accordance with one embodiment, when in an expanded state, the peripheral device may have a length which conforms to the ExpressCard standard, and when in a collapsed state, the peripheral device may have a form factor approximating that of a CompactFlash card. The peripheral device includes an outer sheath defining a hollow interior space within which a semiconductor card and an actuator system may be enclosed. A connector is provided in the front end of the peripheral device for transferring signals between the card and a host device to which the peripheral device is connected.

The actuation system may in general include a mechanical release, a biasing mechanism and a locking mechanism. In general, the biasing mechanism may bias the peripheral device into an expanded position. In one embodiment, the biasing mechanism may comprise a pair of springs wrapped around telescoping rods. The springs are provided under compression and have a first end biased against the card and a second end biased against back end of sheath to bias those components away from each other. In an embodiment, the biasing mechanism exerts a load so that, upon actuation of the mechanical release, the peripheral device snaps quickly and completely from the collapsed position to the extended position. Other mechanical arrangements are contemplated for biasing the sheath and card away from each other.

The mechanical release is provided to hold the peripheral device in a collapsed position against the biasing force of the biasing mechanism. In embodiments, the mechanical release may be affixed to the sheath and include a clasp capable of engaging a lip provided at a front portion of the card. When the mechanical release is pressed downward, the clasp may clear the lip, thus freeing the card to extend away from the sheath under the biasing force of the biasing mechanism. Other mechanical arrangements are contemplated for detachably latching the sheath and card together.

In embodiments, the mechanical release may be manually actuated by a user of the peripheral device, or it may be automatically actuated upon insertion of the peripheral device into a slot of a host device. In automatically expanding embodiments, mechanisms may be provided in the peripheral device and/or host device so that the peripheral device only expands when used within an elongated slot sized to receive the expanded peripheral device (such as for example within an ExpressCard slot). In one embodiment, the mechanical release may be automatically actuated when inserted into an elongated slot as a result of an upper surface of the slot contacting the mechanical release upon insertion of the peripheral device. The same peripheral device may be inserted into a compact host device slot without expanding by providing a channel in the host device slot which receives the mechanical release upon insertion of the peripheral device. Thus, in the compact device slot, no portion of the slot contacts the release mechanism, and the peripheral device remains in the collapsed position. Other mechanical arrangements are contemplated for expanding the peripheral device when used within an elongated slot and for leaving the device in a collapsed position when used in a compact slot.

The locking mechanism may be provided to ensure that, once extended, the peripheral device remains in the extended position while the peripheral device is pushed into mating contact with the host device slot. In one embodiment, the locking mechanism may comprise a pair of levers rotatable around respective pins mounted within the sheath. Each lever may include a first end provided along a side of the card, and a second end having a button. Springs may be wrapped around pins to bias first end against the sides of card.

When in a collapsed position, the locking mechanism does not interfere with the expansion of the card relative to the sheath. However, once the card extends past the first ends of the levers, the first ends of the levers rotate inward, where the first ends block the card from moving back to the collapsed position. Upon inward rotation of the first ends, the buttons at the opposite ends rotate outward and protrude through openings provided in the sheath. After the peripheral device is withdrawn from the host device slot, the buttons may be manually pressed inward to move the first ends away from the card. This action allows the user to manually slide the sheath back over the card against the force of the biasing mechanism until the mechanical release once again latches the peripheral device in the collapsed position. Other mechanical arrangements are contemplated for releasably locking the peripheral device in an expanded position.

The peripheral device may work within an ExpressCard slot, and, in an expanded position, may have a length of about 75 mm and a width of about 34 mm. In such an embodiment, the peripheral device may operate as would other conventional ExpressCards. However, when not in use in an ExpressCard slot, the peripheral device may be collapsed, where it may have a length of about 40 to 45 mm and a width of about 34 mm. Such a size is about the same as a conventional CompactFlash card. Thus, users accustomed to the size, look and feel of a conventional CompactFlash card may still use a peripheral device of approximately that size in their digital cameras, video cameras or other devices, while at the same time availing themselves of the advantages that the ExpressCard interface has to offer. Peripheral devices of the present invention may operate according to standards other than the ExpressCard standard, and may have sizes in the expanded and collapsed positions unrelated to ExpressCards and/or CompactFlash cards.

DETAILED DESCRIPTION

Embodiments will now be described with reference to FIGS. 1 through 10, which relate to an expandable and collapsible peripheral device, and method of manufacturing same. It is understood that the present invention may be embodied in many different forms and should not be construed as being limited to the embodiments set forth herein. Rather, these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

Figure 1:
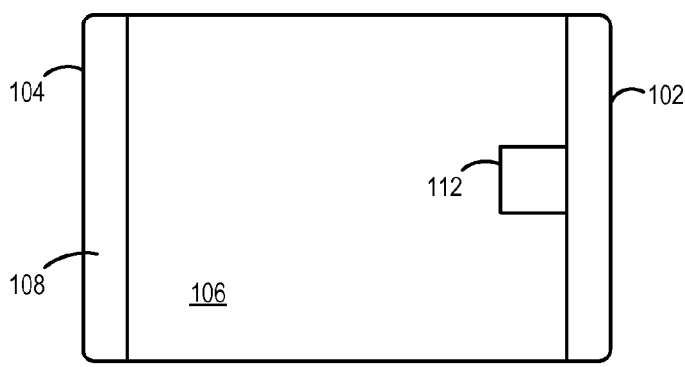
FIG. 1 is a top view of a peripheral device in a collapsed position according to an embodiment of the present invention.
Figure 2:
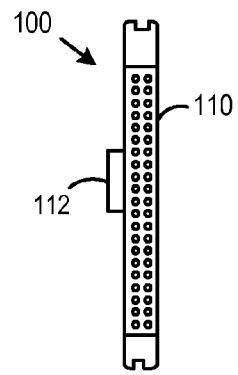
FIG. 2 is a front view of a peripheral device according to an embodiment of the present invention.
Figure 3:
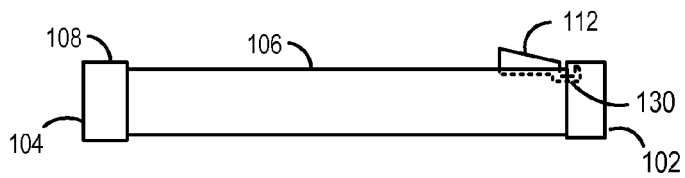
FIG. 3 is a side view of a peripheral device in a collapsed position according to an embodiment of the present invention.

FIGS. 1 through 3 show a peripheral device 100 in a collapsed position. Device 100 may include a front end 102 and a back end 104 as shown. Visible in the view of FIG. 1 is an outer sheath 106 acting as an enclosure for a card and actuator system as described hereinafter. Sheath 106 may be formed of metal, plastic or a variety of other materials and may comprise walls defining a hollow space within which the card and actuator system may be enclosed. Back end 104 may include a finger grip 108 on a top and/or bottom of the sheath by which the sheath 106 and peripheral device 100 may be grasped upon insertion or removal of the device. The finger grip 108 may be omitted in embodiments of the invention.

Visible in the front view of FIG. 2 is a connector 110 provided within device front end 102. Connector 110 is provided for transferring signals between the card and a host device to which the peripheral device 100 is connected. Connector 110 may be a 26-pin, beam-on-blade style connector used in the ExpressCard standard, but other types of connectors are contemplated.

Figure 4:
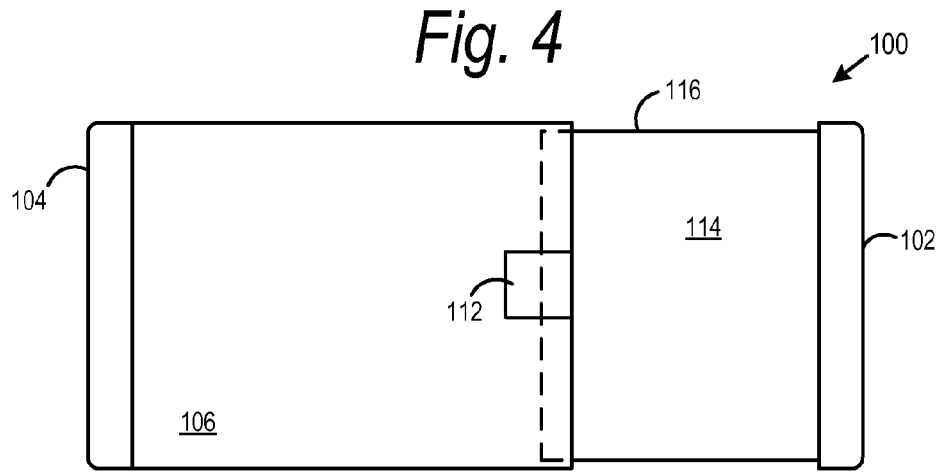
FIG. 4 is a top view of a peripheral device in an expanded position according to an embodiment of the present invention.

As seen in FIGS. 1 through 4, device 100 may further include a mechanical release 112 for allowing the peripheral device 100 to move from a collapsed position to an extended position shown in FIG. 4 and as explained in greater detail hereinafter. As is also explained hereinafter, while the mechanical release 112 is shown on a top surface of the peripheral device 100, proximate to front end 102, the mechanical release 112 may be located along one or both side edges and/or proximate the device back end 104 in alternative embodiments.

In the expanded position shown in FIG. 4, the card 114 is shown extended from within sheath 106. Card 114 may be or include any of various semiconductor devices having an integrated circuit. In one embodiment, the card 114 may for example be a flash memory module for reading data from and/or writing data to a host device to which the peripheral device is connected via connector 110. It is understood that card 114 may be a variety of other semiconductor devices in further embodiments of the present invention. The semiconductor components of card 114 (such as semiconductor die 126 and passive components 128 shown in phantom in FIGS. 5 and 6) may be encased within a protective card housing 116 seen in FIG. 4. Card housing 116 may for example be a plastic cover molded around the semiconductor components, but other types of covers are contemplated. As current semiconductor devices are capable of storing and processing large amounts of data in small form factors, the card 114 may occupy only a portion of the space defined within sheath 106, leaving room for the actuation system as explained below.

Although not shown in the figures, the front portion of the sheath 106 and the rear portion of the card housing 116 (proximate to each other in the expanded position shown in FIG. 4) may each be formed with a lip which interlock with each other to prevent complete separation of the card 114 from the sheath 106. Those of skill in the art will appreciate other mechanisms for preventing complete separation of the card 114 from the sheath 106 when device 100 is in the expanded position.

An embodiment showing the operation of peripheral device 100 to move between the collapsed and expanded positions will now be explained with reference to the top views of FIGS. 5 and 6. The actuation system may in general include mechanical release 112, biasing mechanism 120 and locking mechanism 122, each of which is explained hereinafter. The biasing mechanism 120 and locking mechanism 122 are shown for the most part in phantom, encased within sheath 106. While the following description sets forth a few embodiments of each of the mechanical release 112, biasing mechanism 120 and locking mechanism 122, those of skill in the art will appreciate that a variety of other such mechanisms may be provided by which the peripheral device 100 may move between, and be maintained in, the expanded and collapsed positions.

In general, biasing mechanism 120 may bias the peripheral device 100 into an expanded position. The biasing mechanism 120 shown in FIGS. 5 and 6 comprises a pair of springs wrapped around telescoping rods. The rods have opposite ends attached to a back end of the sheath 106 and a back end of the card housing 116. The springs are provided under compression and have a first end biased against the card housing 116 and a second end biased against back end of sheath 106. The length of the springs and the spring constants of the springs may vary in alternative embodiments. However, in an embodiment, the biasing mechanism 120 exerts a load so that, upon actuation of the mechanical release as explained below, the peripheral device 100 snaps quickly and completely from the collapsed position to the extended position. The load may be such that a user is able to feel and/or hear that the device 100 has extended to the expanded position, but not so great that a user is prone to lose a grip on the device 100 under the force of the expansion.

While two springs and rods are shown, there may be only one or more than two in further embodiments. Additionally, the springs and rods may be closer or farther from the sides of the sheath 106 in further embodiments. Moreover, while a pair of helical springs are shown wrapped around telescoping rods, it is understood that other known biasing mechanisms 120 may be used to move the peripheral device from the collapsed position to the extended position upon actuation of the mechanical release 112.

Mechanical release 112 may hold the peripheral device 100 in a collapsed position against the biasing force of the biasing mechanism 120. In embodiments, the mechanical release 112 may be affixed to sheath 106 and include a clasp 130 (FIG. 3) capable of engaging a lip provided at a front portion of the card 114 (either formed within the card housing 116 or formed within an element affixed to the card housing 116). When the mechanical release is pressed downward, the clasp 130 may clear the lip, thus freeing the card 114 to extend away from the sheath 106 under the biasing force of the biasing mechanism 120.

In embodiments, the mechanical release 112 may be manually actuated by a user of the peripheral device 100, or it may be automatically actuated upon insertion of the peripheral device 100 into a slot of a host device. As explained hereinafter, in automatically expanding embodiments, mechanisms are provided in the peripheral device 100 and/or host device so that the peripheral device only expands when used within a slot sized to receive the expanded peripheral device (such as for example within an ExpressCard slot).

In embodiments where the mechanical release 112 is manually operated, when positioned proximate front end 102 of device, the release 112 may be actuated by a user depressing the release 112 prior to insertion of the peripheral device into a host device slot. However, as indicated above, the mechanical release need not be positioned proximate the front end 102. Those of skill in the art would appreciate that the mechanical release may function to latch the sheath 106 to the card 114 when located at a variety of other locations on the peripheral device 100.

For example, the mechanical release may be positioned proximate back end 104. In such embodiments, the release 112 may be actuated by a user depressing the release prior to or during insertion of the peripheral device into a host device slot. In embodiments, the mechanical release may be positioned on the sides of sheath 106, on a bottom surface of sheath 106, or at a rear surface of sheath 106 at back end 104. While a single mechanical release is shown, it is understood that a pair of mechanical releases may be provided at opposed positions on sheath 106 so as to be manually actuated with equal and opposite forces. Moreover, while the mechanical release is described as including a clasp 130 engaging a lip on the card 114, it is understood that a variety of other latching mechanisms may be used which disengage upon actuation.

As indicated, the mechanical release 112 may operate automatically. In such an embodiment, the peripheral device should automatically expand when used in an elongated slot sized to operate with the expanded peripheral device, but not expand when used in a compact slot sized to operate with the collapsed peripheral device. As explained below, the trigger mechanism for either automatically expanding or not expanding the peripheral device may be provided in the host device slot or on the peripheral device 100 itself.

Figure 7:
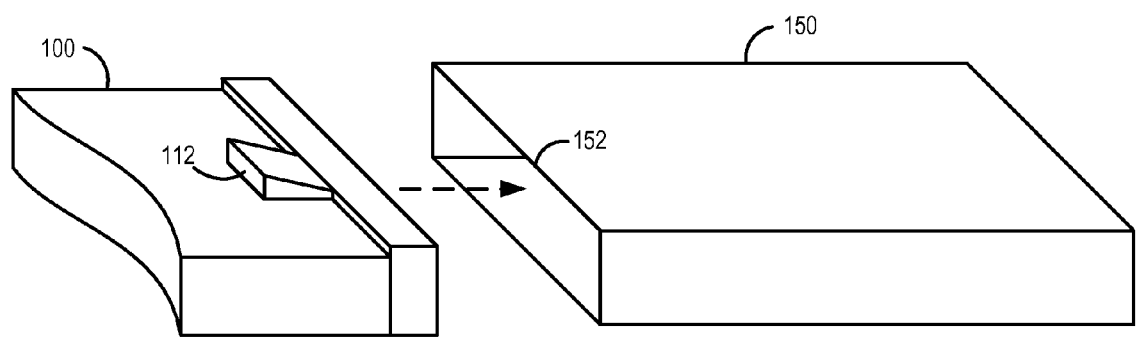
FIG. 7 is a perspective view of a peripheral device being inserted into an elongated host device slot according to an embodiment of the present invention.
Figure 8:
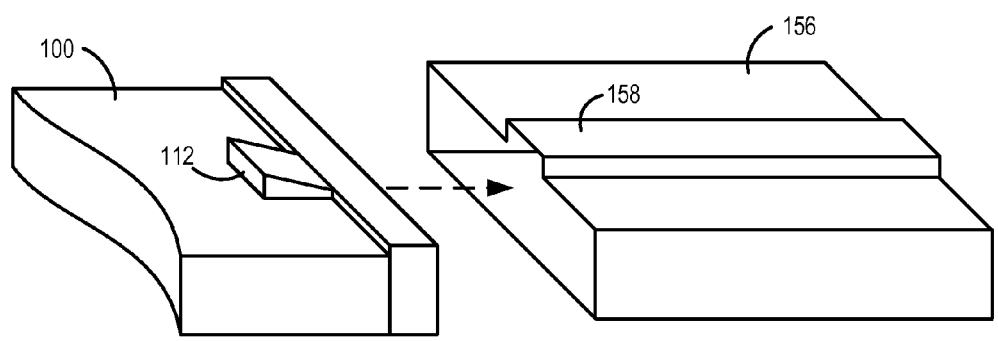
FIG. 8 is a perspective view of a peripheral device being inserted into a compact host device slot according to an embodiment of the present invention.

FIGS. 7 and 8 illustrate embodiments where the trigger mechanism for either automatically expanding or not expanding the peripheral device is provided in the host device slot. In particular, FIG. 7 shows an elongated slot 150. Slot 150 may be an ExpressCard slot, but need not be in alternative embodiments. In this embodiment, mechanical release 112 may be sloped upward, front to back, such that a rear portion of the release 112 protrudes above the remaining portions of the peripheral device 100. The relative sizes of slot 150 and device 100 are provided such that, upon insertion of the peripheral device 100 into slot 150, a portion of the sloped mechanical release 112 will engage a surface 152 of slot 150. Upon continued insertion of device 100, surface 152 will depress the sloped mechanical release 112 to extend the peripheral device to its expanded position. While a front edge of surface 152 is shown in FIG. 7 sized to engage and depress mechanical release 112, it is understood that slot 150 may have a larger height at its front section, and get progressively narrower toward its back section. With such a configuration, the mechanical release 112 will be engaged by surface 152 some time after the initial entry of the device front end 102 into slot 150.

The peripheral device may alternatively be used in a compact slot, such as slot 156 shown in FIG. 8. Slot 156 may be a slot in an imaging device such as a digital or video camera, but slot 156 may be a slot in a variety of other host devices in alternative embodiments. Slot 156 is provided with a channel 158 aligned to receive mechanical release 112 as the peripheral device 100 is inserted into slot 156. Slot 156 and channel 158 are sized so as not to engage mechanical release 112 during insertion of the device 100. Thus, mechanical release 112 is not actuated and the peripheral device remains in the collapsed position. Those of skill in the art would appreciate alternative configurations of slot 156. For example, instead of a channel 158, the height of slot 156 may be enlarged across its entire width so that no portion of the mechanical release 112 engages the slot upon insertion of the peripheral device. Such an embodiment may operate with guides to ensure proper positioning of the connector 110 with respect to the mating connector in the slot 156.

As indicated above, the mechanical release 112 may be located at other positions on the sheath 106. Slot 156 may include one or more channels 158 corresponding to the position(s) of the mechanical release(s) 112 in such embodiments so that the release 112 is not engaged as the peripheral device is inserted into the slot 156.

Further embodiments are contemplated where the elongated and compact slots are physically identical to each other, and some other mechanism is provided in the peripheral device 100 and/or host device slot as the trigger to either extend or not extend the peripheral device. For example, the mechanical release 112 and biasing mechanism 120 may be replaced by an electrical drive system provided at least partially within the interior space defined by sheath 106. The drive system may for example comprise a miniature motor for rotating a lead screw, gear train or motion transmission system. The motor may be activated upon insertion of peripheral device into the elongated slot (for example by providing an electrical contact on the peripheral device which connects with a host device voltage source upon device insertion). Upon actuation, the drive system may actuate the peripheral device into the expanded position.

It is envisioned in a further embodiment that a solenoid could be used within sheath 106, which drives the peripheral device into an expanded position, or at least actuates the mechanical release so that the biasing mechanism moves the peripheral device into an expanded position. In a further embodiment, a metallic ball, pin or switch may be positioned within the sheath 106. The ball/pin/switch may be movable between a first position which prevents actuation of the mechanical release 112 and a second position which does not prevent actuation of the mechanical release 112. In such an embodiment, the host device slot may include a magnet to position the ball/pin/switch in the desired first or second position upon insertion of the peripheral device into the slot. Other trigger mechanisms would be appreciated by those of skill in the art to selectably extend or not extend the peripheral device 100.

Where a peripheral device is automatically extended in accordance with an embodiment described above, the peripheral device may be fully extended prior to the connectors 110 in the front end 102 reaching their mating connectors in the host device slot. This need not be so in alternative embodiments.

Figure 9:
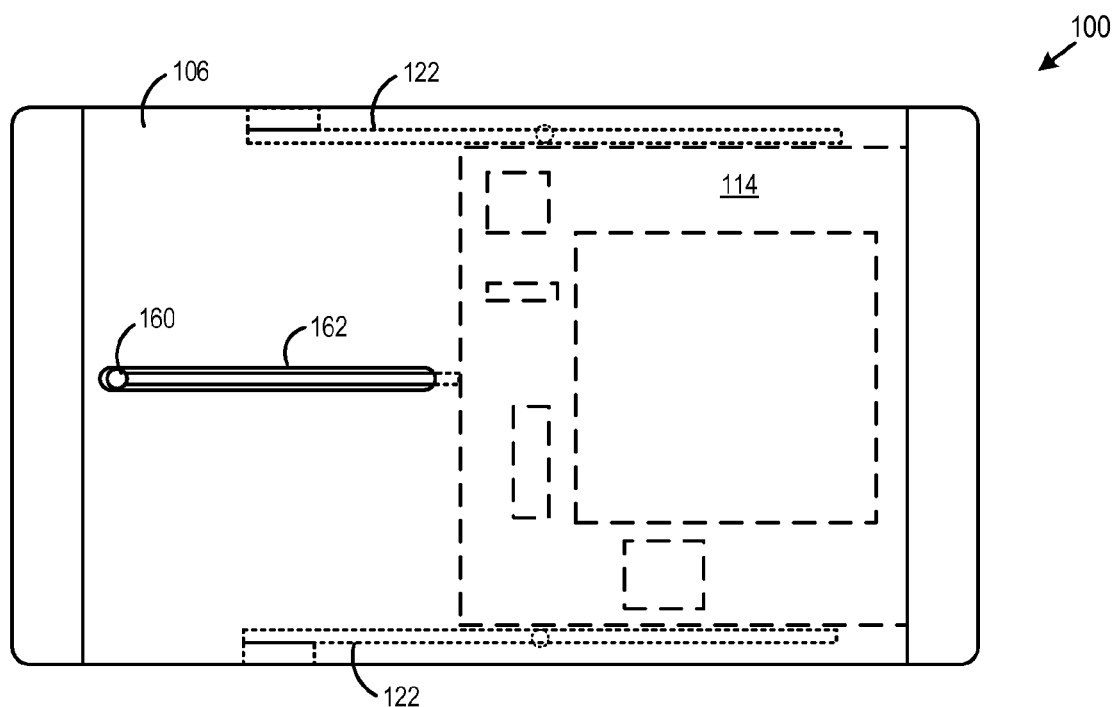
FIG. 9 is a top view into the interior of a peripheral device in a collapsed position according to an alternative embodiment of the present invention.
Figure 10:
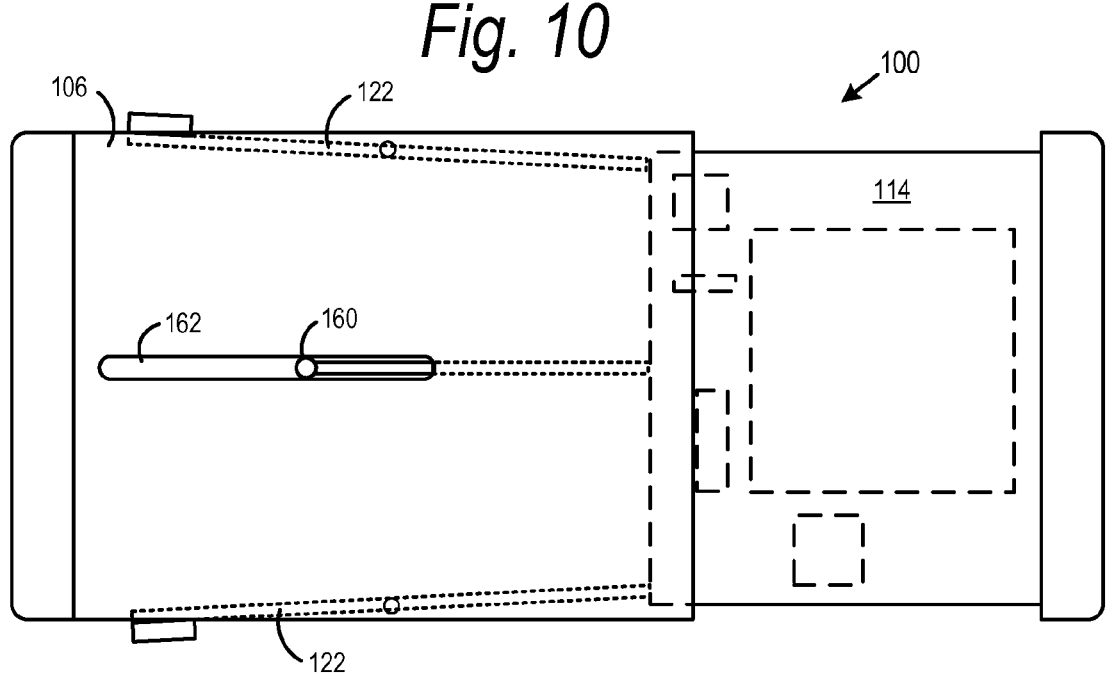
FIG. 10 is a top view into the interior of a peripheral device in an expanded position according to an alternative embodiment of the present invention.

FIGS. 9 and 10 show a still further embodiment where the mechanical release 112 and biasing mechanism 120 are replaced by a slide button 160. In such an embodiment, the slide button rides within a slot 162 formed in the surface of shroud 106 and may have an end affixed to card 114. As seen in FIG. 10, actuation of the slide button 160 may extend the card 114 away from the sheath 106, upon which it locks by locking mechanism 122 as explained hereinafter.

In a still further embodiment, it is contemplated that instead of expanding, the peripheral device 100 may be adapted to receive a separate and independent extension piece (not shown). In such an embodiment, sheath 106, mechanical release 112 and biasing mechanism 120 may all be omitted. Instead, when used in a compact slot, the card 114 may be used by itself, and when used in an elongated slot, the extension piece may be fit over the back end of card 114 opposite connector 110. The card 114 and extension piece together may be sized to fit properly in the elongated slot.

Referring again to FIGS. 5 and 6, the locking mechanism 122 is provided for locking the peripheral device 100 in an expanded position once extended. In particular, after extension of the peripheral device 100, a user needs to exert sufficient force on the back end 104 to ensure proper mating of the connector 110 with the corresponding connector in the host device slot. This force exerted by the user may exceed that which is necessary to ensure proper mating. The locking mechanism 122 may be provided to ensure that the device 100 remains in the extended position under this load.

Figure 5:
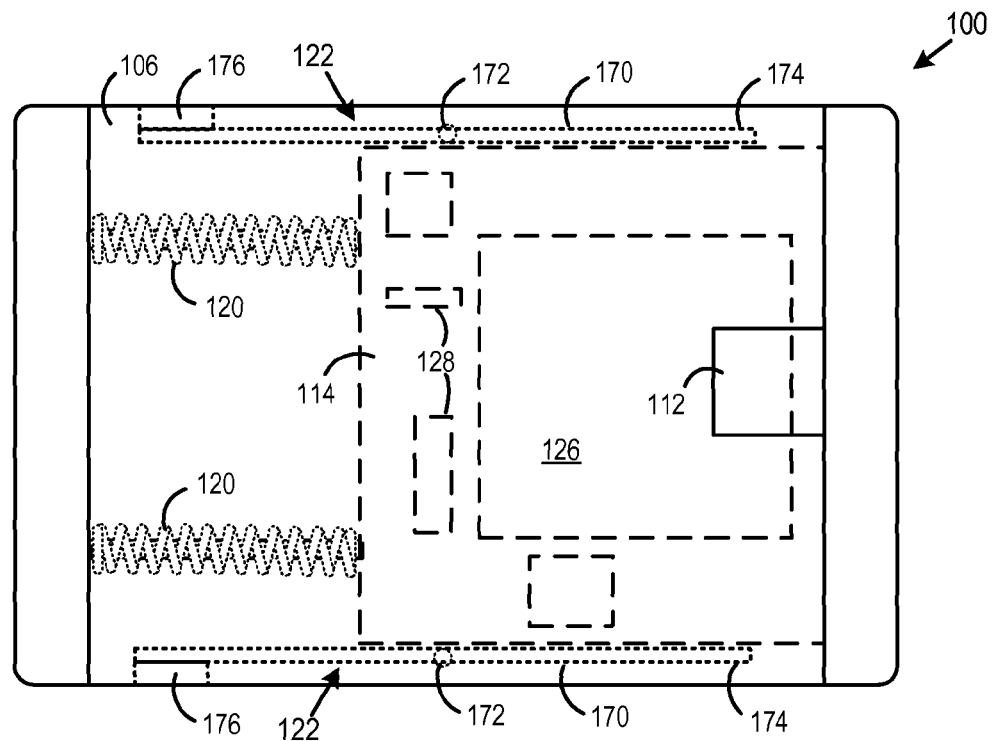
FIG. 5 is a top view into the interior of a peripheral device in a collapsed position according to an embodiment of the present invention.
Figure 6:
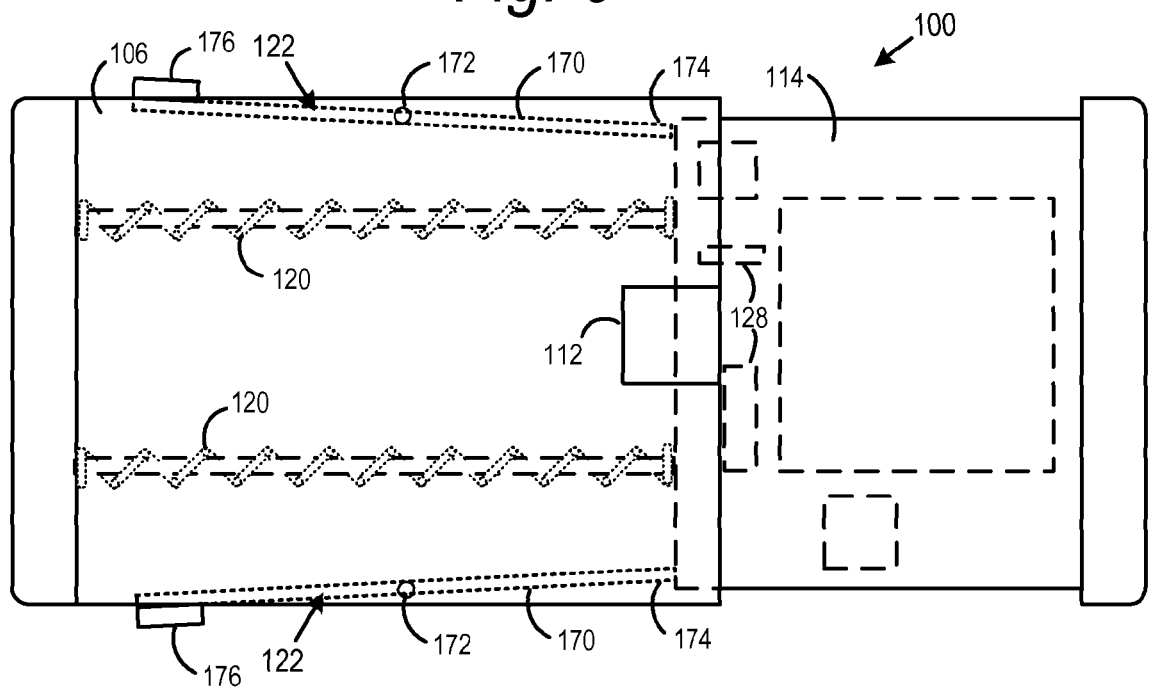
FIG. 6 is a top view into the interior of a peripheral device in an expanded position according to an embodiment of the present invention.

In the embodiment shown in FIGS. 5 and 6, locking mechanism 122 may comprise a pair of levers 170 rotatable around respective pins 172 mounted within the sheath 106. Each lever 170 may include a first end 174 provided along a side of the card housing 116, and a second end having a button 176. Springs (not shown) may be wrapped around pins 172 to bias first end 174 against the sides of card housing 116. As seen in FIG. 5, when in a collapsed position, the locking mechanism does not interfere with the expansion of the card 114 relative to the sheath 106. However, once the card 114 extends past the ends 174 of levers 170, the levers rotate ends 174 inward, where the ends 174 block the card 114 from moving back to the collapsed position.

Upon inward rotation of the ends 174, the buttons 176 rotate outward and protrude through openings provided in the sheath 106. After the peripheral device is withdrawn from the host device slot, the buttons 176 may be manually pressed inward to move ends 174 away from the card 114. This action allows the user to manually slide the sheath 106 over the card 114 against the force of the biasing mechanism 120 until the mechanical release 112 once again latches the peripheral device 100 in the collapsed position. Instead of buttons 176 protruding from the sides of the sheath 106, the back ends of levers 170 may be extended so that portions protrude out of the back end 104 of device 100. In order to disengage the locking mechanism in such an embodiment, the protruding portions may be manually moved inward toward each other, thus removing opposite ends 174 from card 114 and allowing collapse of the peripheral device.

Those of skill in the art will appreciate a great many other mechanisms for locking the peripheral device 100 in an extended position, which mechanisms may be moved out of the locking position when it is desired to collapse the peripheral device 100.

With the above-described embodiments, a peripheral device 100 may be provided according to the ExpressCard standard. Namely, the peripheral device 100 may work within an ExpressCard slot, and, in an expanded position, may have a length of about 75 mm and a width of about 34 mm. The thickness of the device may be between 3 mm and 8 mm, and may be 5 mm. In such an embodiment, the peripheral device 100 may operate as would other conventional ExpressCards. However, when not in use in an ExpressCard slot, the peripheral device 100 may be collapsed, where it may have a length of about 40 mm to 45 mm and a width of about 34 mm. Such a size is about the same as a conventional CompactFlash card. Thus, users accustomed to the size of a conventional CompactFlash card may still use a peripheral device of approximately that size in their digital cameras, video cameras or other devices, while at the same time availing themselves of the advantages that the ExpressCard interface has to offer.

Embodiments of the present invention thus provide compatibility with the ExpressCard standard and the look and feel of a CompactFlash card. However, it is understood that peripheral devices of the present invention may operate according to standards other than the ExpressCard standard, and may have sizes in the expanded and collapsed positions unrelated to ExpressCards and/or CompactFlash cards.

In embodiments described above, expansion of the peripheral device 100 is accomplished by adding real estate onto the back end of the device, i.e., the end of the device opposite the end 102 including connector 110. This may be preferred in that no additional electrical connections or other components need be added to the back end of the device when expanding the device. However, in further embodiments, it is contemplated that real estate alternatively be added to the front end 102 of the device. In such an embodiment, the portion which expands would be added between connector 110 and the mating connector in the host device slot. The expanding portion would include a first connector which mates with connector 110, and a second connector which mates with the connector in the host device slot to ensure proper transfer of the signals between the peripheral and host device.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A peripheral device capable of operation within one or more host devices, the peripheral device comprising:
   a card including an integrated circuit;
   a sheath slidably coupled to the card, the sheath movable between a first position with respect to the card where the sheath and card together have a first length, and a second position with respect to the card where the sheath and card and together have a second length, the first length being different than the second length; and
   an actuation system at least partially coupled between the card and sheath moving the sheath from the first position to the second position.

2. A peripheral device as recited in claim 1, wherein the actuation system comprises one or more springs for biasing the sheath into the second position with respect to the card.

3. A peripheral device as recited in claim 1, wherein the actuation system comprises a mechanical release for releasably holding the sheath in the first position with respect to the card.

4. A peripheral device as recited in claim 1, wherein the actuation system comprises a locking mechanism for releasably locking the sheath in the second position with respect to the card.

5. A peripheral device as recited in claim 2, wherein the second length conforms to the ExpressCard standard.

6. A peripheral device as recited in claim 5, wherein the first length is approximately a dimension of a CompactFlash card.

7. A peripheral device as recited in claim 2, wherein the second length is approximately 75 mm.

8. A peripheral device as recited in claim 7, wherein the first length is between approximately 40 mm to 45 mm.

9. A peripheral device capable of operation within one or more host devices, the peripheral device comprising:
   a card including an integrated circuit;
   a sheath movably coupled to the card, the sheath capable of being in a first position collapsed over the card, and the sheath capable of being in a second position extended partially away from the card; and
   an actuation system at least partially coupled between the card and sheath for moving the sheath from the first position to the second position, wherein the actuation system comprises a biasing mechanism for biasing the sheath in the second position, the biasing mechanism comprises one or more springs in contact with the sheath and card biasing the sheath and card away from each other.

10. A peripheral device as recited in claim 9, wherein the actuation system comprises a release for releasably holding the sheath in the first position.

11. A peripheral device as recited in claim 10, wherein the release comprises a mechanical release mounted on the sheath and including a clasp capable of releasably engaging a portion of the sheath.

12. A peripheral device as recited in claim 9, wherein the actuation system comprises a locking mechanism for releasably locking the sheath in the second position.

13. A peripheral device as recited in claim 12, wherein the locking mechanism comprises a lever mounted to the sheath and having a first portion capable of engaging the card to prevent movement of the sheath from the second position to the first position.

14. A peripheral device as recited in claim 13, wherein the locking mechanism further comprises a second portion for moving the first portion out of engagement with the card to allow movement of the sheath from the second position to the first position.

15. A peripheral device capable of operation within one or more host devices, the peripheral device comprising:
   a sheath defining a hollow interior space;
   a card including an integrated circuit mounted to the sheath within the hollow interior space to move between first and second positions with respect to the sheath;
   one or more springs within the interior space for biasing the sheath away from the card;
   a release mounted to one of the card and sheath for releasably holding the card in the first position with respect to the sheath; and
   a locking mechanism engaging the sheath and card when the card is in the second position with respect to the sheath, the locking mechanism releasably holding the card in the second position with respect to the sheath.

16. A peripheral device as recited in claim 15, wherein the release may be manually disengaged from holding the card in the first position with respect to the sheath.

17. A peripheral device as recited in claim 15, wherein the release may be automatically disengaged from holding the card in the first position with respect to the sheath upon insertion of the peripheral device into a host device.

18. A peripheral device as recited in claim 15, the peripheral device further comprising a connector at a front end of the peripheral device for connecting the peripheral device to a host device.

19. A peripheral device as recited in claim 18, wherein the release is mounted adjacent the front end of the peripheral device.

20. A peripheral device as recited in claim 18, wherein the release is mounted adjacent a back end of the peripheral device opposite the front end of the peripheral device.

* * * * *